(12) United States Patent
Lee et al.

(10) Patent No.: US 11,588,861 B2
(45) Date of Patent: Feb. 21, 2023

(54) ELECTRONIC DEVICE AND OPERATING METHOD FOR REGISTERING IP MULTIMEDIA SUBSYSTEM

(71) Applicant: Samsung Electronics Co., Ltd., Suwon-si (KR)

(72) Inventors: Wooyong Lee, Suwon-si (KR); Hyunjae Kim, Suwon-si (KR); Seunghoon Nam, Suwon-si (KR); Yeungseob Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 17/030,071

(22) Filed: Sep. 23, 2020

(65) Prior Publication Data
US 2021/0092165 A1    Mar. 25, 2021

(30) Foreign Application Priority Data

Sep. 23, 2019  (KR) .......................... 10-2019-0116941

(51) Int. Cl.
*H04L 65/1016* (2022.01)
*H04L 65/1073* (2022.01)
*H04L 65/1104* (2022.01)

(52) U.S. Cl.
CPC ...... *H04L 65/1016* (2013.01); *H04L 65/1073* (2013.01); *H04L 65/1104* (2022.05)

(58) Field of Classification Search
CPC ............ H04L 65/1016; H04L 65/1006; H04L 65/1073

USPC ......................................................... 370/352
See application file for complete search history.

(56) References Cited

U.S. PATENT DOCUMENTS

| | | | |
|---|---|---|---|
| 2008/0014956 A1 | 1/2008 | Balasubramanian | |
| 2008/0089290 A1* | 4/2008 | Coulas ................. | H04W 76/38 370/331 |
| 2008/0259870 A1* | 10/2008 | Olvera-Hernandez ..................... | H04L 67/14 370/331 |
| 2013/0203465 A1* | 8/2013 | Ali ...................... | H04L 65/1016 455/558 |
| 2017/0078171 A1 | 3/2017 | Tapia et al. | |
| 2020/0359212 A1* | 11/2020 | Chen .................... | H04W 12/08 |

(Continued)

FOREIGN PATENT DOCUMENTS

WO    2018/080245 A2    5/2018

OTHER PUBLICATIONS

Quazwersxce X, "Enable VoLTE On Any Samsung Phone!," YouTube video, Mar. 20, 2017, 1 page.

(Continued)

*Primary Examiner* — Jeffrey R Swearingen

(57) ABSTRACT

An electronic device according to an embodiment may include a communication circuit, a processor, operatively connected to the communication circuit, and a memory operatively connected to the processor. The memory may store instructions to cause the processor to update an application including IP multimedia subsystem (IMS)-related data. Based on the update data received from a server through the communication circuit, obtain the updated IMS-related data through the application when the application is updated, and renew the IMS configuration information.

16 Claims, 7 Drawing Sheets

(56) References Cited

U.S. PATENT DOCUMENTS

2021/0004222 A1* 1/2021 Huang .................. G06F 8/654

OTHER PUBLICATIONS

Technewlogy, "Enable VoLTE for JIO on any Samsung Galaxy device (ROOT)," YouTube video, Nov. 7, 2016, 1 page.
Rok777, "PC/mobile VOLTE The present reality that there are limitations of overseas devices," clien.net, Mar. 11, 2017, 10 pages.
Zephyr!, "No volte in India (UAE variant)," Samsung Galaxy S8 forum, Jun. 5, 2017, 7 pages.
Sliwa et al., "Empirical Analysis of Client-based Network Quality Prediction in Vehicular Multi-MNO Networks", IEEE 90th Vehicular Technology Conference, Apr. 23, 2019, 7 pages.
International Search Report dated Jan. 15, 2021 in connection with International Patent Application No. PCT/KR2020/012789, 4 pages.
Written Opinion of the International Searching Authority dated Jan. 15, 2021 in connection with International Patent Application No. PCT/KR2020/012789, 4 pages.

* cited by examiner

ELECTRONIC DEVICE AND OPERATING METHOD FOR REGISTERING IP MULTIMEDIA SUBSYSTEM

CROSS-REFERENCE TO RELATED APPLICATION

This application is based on and claims priority under 35 U.S.C. 119 to Korean Patent Application No. 10-2019-0116941, filed on Sep. 23, 2019, in the Korean Intellectual Property Office, the disclosure of which is herein incorporated by reference in its entirety.

BACKGROUND

1. Field

The disclosure relates to an electronic device for registering an IP multimedia subsystem (IMS) and an operating method thereof.

2. Description of Related Art

Electronic devices may register IMS configuration information thereof with a mobile network operator (MNO). The electronic device may receive an IMS service from a mobile network operator based on the IMS configuration information.

The IMS configuration information for the IMS service of the electronic device may be updated based on a firmware over the air (FOTA) method or an open mobile customization (OMC) update method.

The above information is presented as background information only to assist with an understanding of the disclosure. No determination has been made, and no assertion is made, as to whether any of the above might be applicable as prior art with regard to the disclosure.

SUMMARY

A FOTA method for updating IMS configuration information for an IMS service of an electronic device is a method for generating update data related to a number of applications. Therefore, since the size of the update data according to the FOTA method is rather large, the time taken to download the update data may be rather long. In addition, when updating the IMS configuration information according to the FOTA method, it may take time to optimize a plurality of applications installed in the electronic device. In addition, when updating the IMS configuration information according to the FOTA method, it may take time for the electronic device to reboot.

The OMC update method for updating the IMS configuration information for the IMS service of the electronic device is a method of generating update data for each customer-specific customization (CSC) of the electronic device. Accordingly, when a universal subscriber identity module (USIM) of a mobile network operator (MNO) is inserted into an electronic device of a model that is not supplied by the corresponding mobile network operator (MNO), update data for the corresponding electronic device might not proceed.

Therefore, a method for efficient updating of IMS configuration information may be required.

The technical subjects pursued in the disclosure may not be limited to the above-mentioned technical subjects, and other technical subjects which are not mentioned may be clearly understood, through the following descriptions, by those skilled in the art to which the disclosure pertains.

An electronic device according to an embodiment may include a communication circuit, a processor operatively connected to the communication circuit, and a memory operatively connected to the processor, wherein, when executed, the memory may store instructions to cause the processor to: update an application including IP multimedia subsystem (IMS)-related data, based on the update data received from a first server through the communication circuit; obtain the updated IMS-related data through the application when the application is updated; and renew IMS configuration information, based on the obtained IMS-related data.

An operating method of an electronic device according to an embodiment may include: updating an application including IP multimedia subsystem (IMS)-related data, based on the update data received from a first server through a communication circuit of the electronic device; obtaining the updated IMS-related data through the application when the application is updated; and renewing IMS configuration information, based on the obtained IMS-related data.

According to the electronic device and the operating method thereof, the IMS configuration information can be effectively updated by receiving update data of an IMS configuration kit application through a store application, updating the IMS configuration kit application, based on the received update data, and updating the IMS configuration information, based on the resources included in the updated IMS configuration kit application.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
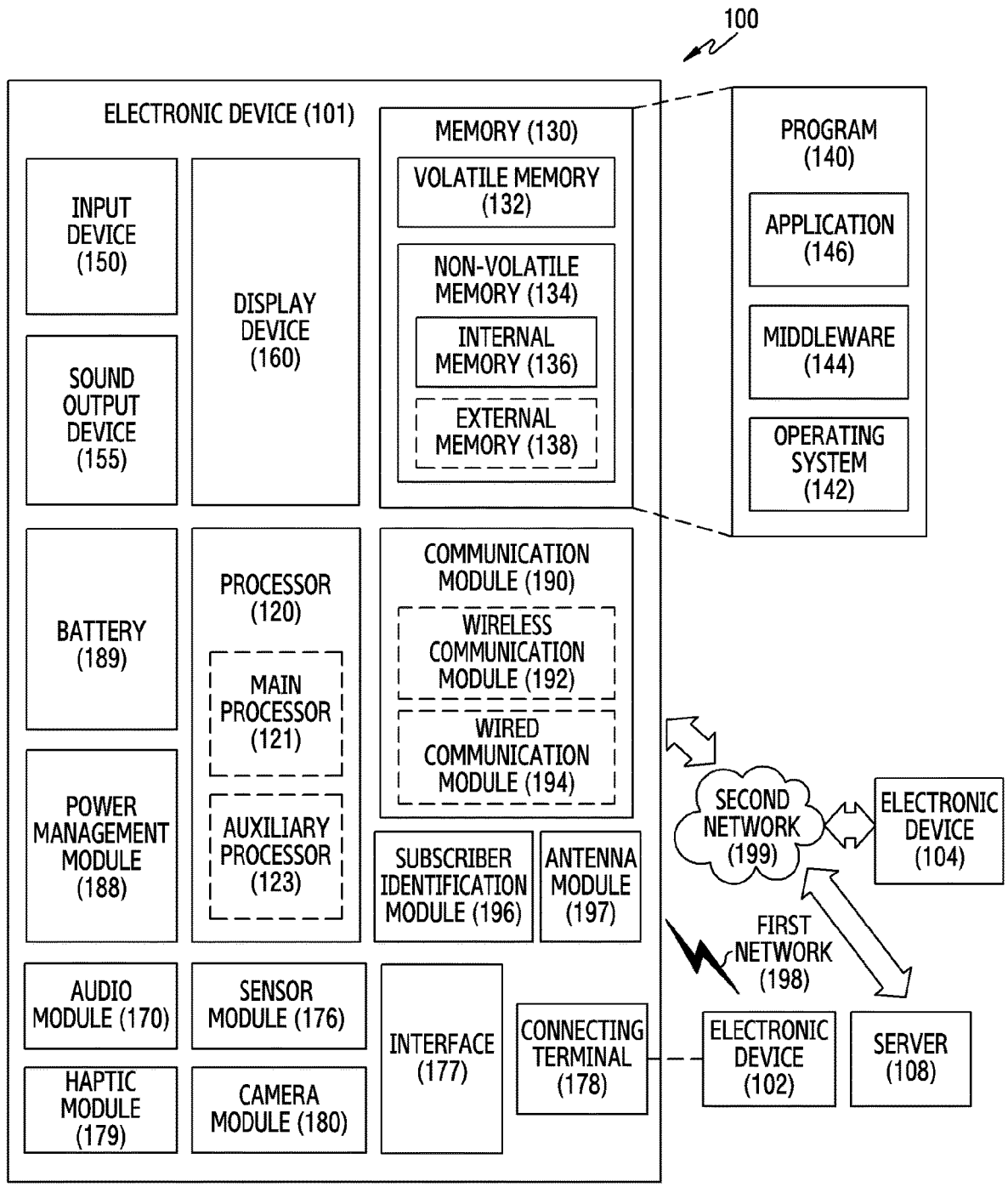
FIG. 1 illustrates a block diagram of an electronic device in a network environment according an embodiment.

FIG. 1 illustrates an example of a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121. In an embodiment, the processor 120 may determine IP (Internet Protocol) multimedia subsystem (IMS) configuration information. In an embodiment, the processor 120 may register the IMS configuration information determined using the communication module 190 to a server operated by a mobile network operator (MNO). In an embodiment, by registering the IMS configuration information in a server operated by an operator (MNO), the electronic device 101 may be provided with IMS service from a mobile network operated by a mobile network operator (MNO). In an embodiment, the IMS configuration information may include MNO information, global configuration information, and IMS profile information.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

In an embodiment, the program 140 may include an IMS module that manages an IMS database with which the processor 120 determines IMS configuration information. In an embodiment, the IMS database may include an MNO map including a plurality of pieces of MNO information, a global configuration database including a plurality of pieces of global configuration information, and an IMS profile database including a plurality of pieces of IMS profile information.

In an embodiment, the program 140 may include an IMS configuration kit that provides resources for updating the IMS database managed by the IMS module (e.g., a SIM mobility kit (SMK) application).

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
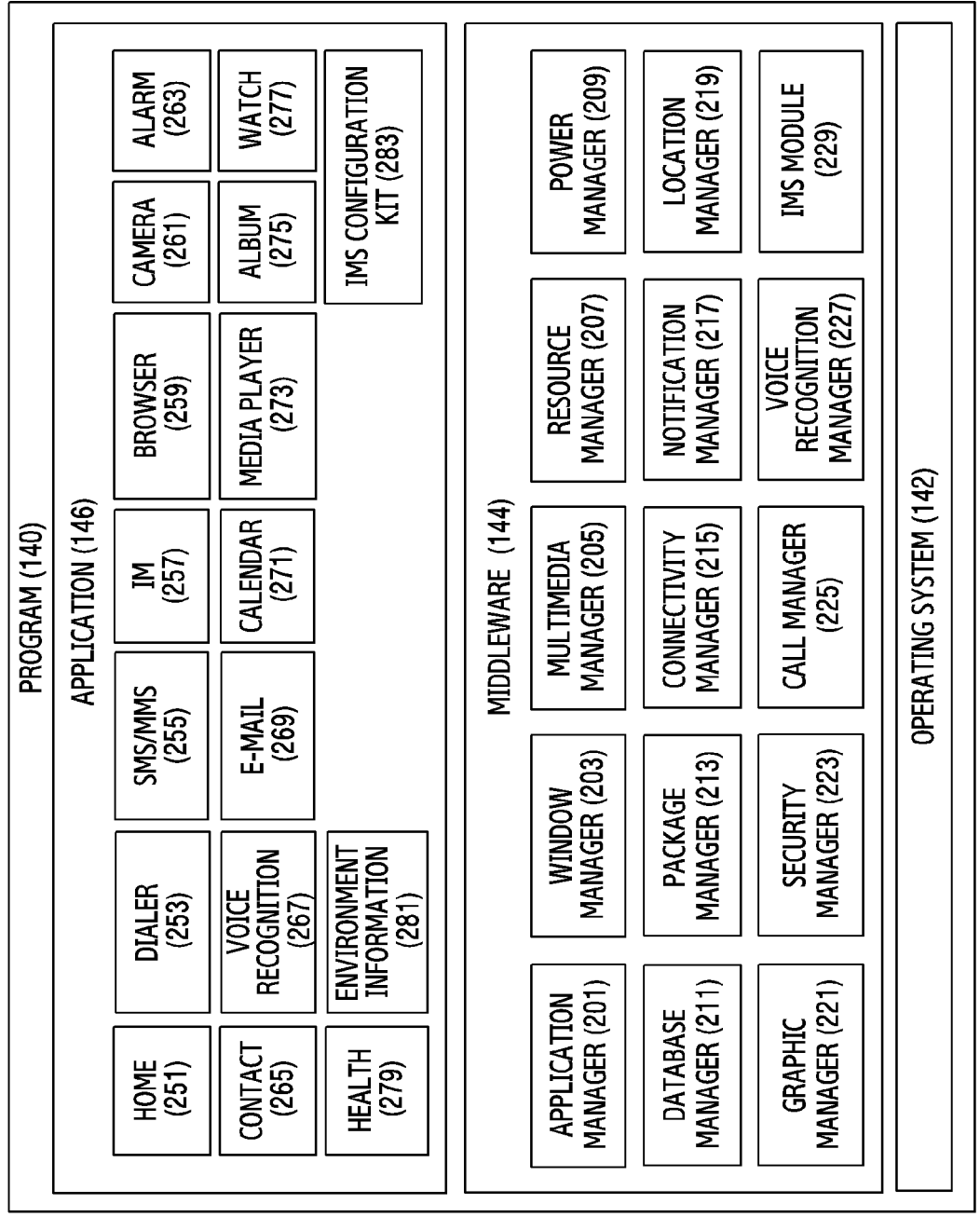
FIG. 2 illustrates a block diagram exemplifying programs according to an embodiment.

FIG. 2 illustrates an example of a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

In an embodiment, an IMS module 229 may manage an IMS database including an MNO map, a global configuration database, and an IMS profile database. In an embodiment, the IMS module 229 may receive subscriber identification information, obtained from a subscriber identity module (SIM), from a call manager and determine IMS configuration information corresponding to the subscriber identification information based on the IMS database. In an embodiment, the IMS module 229 may manage the IMS database to refer to resources to which the IMS database is added (e.g., resources added by an IMS configuration kit 283 or customer-specific customization (CSC) data).

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application executed on the external electronic device.

In an embodiment, the IMS configuration kit 283 may be an application provided by the manufacturer of the electronic device 101. In an embodiment, the IMS configuration kit 283 may be an application stored in a preloaded state in the memory 130. In an embodiment, the IMS configuration kit 283 may provide resources for the IMS database of the IMS module 229. In an embodiment, the IMS configuration kit 283, when updated based on the update data, may provide the updated resources to the IMS module 229. In an embodiment, the update data may be provided to the electronic device 101 through a store application (e.g., Galaxy store, Play store, app store).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with" or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
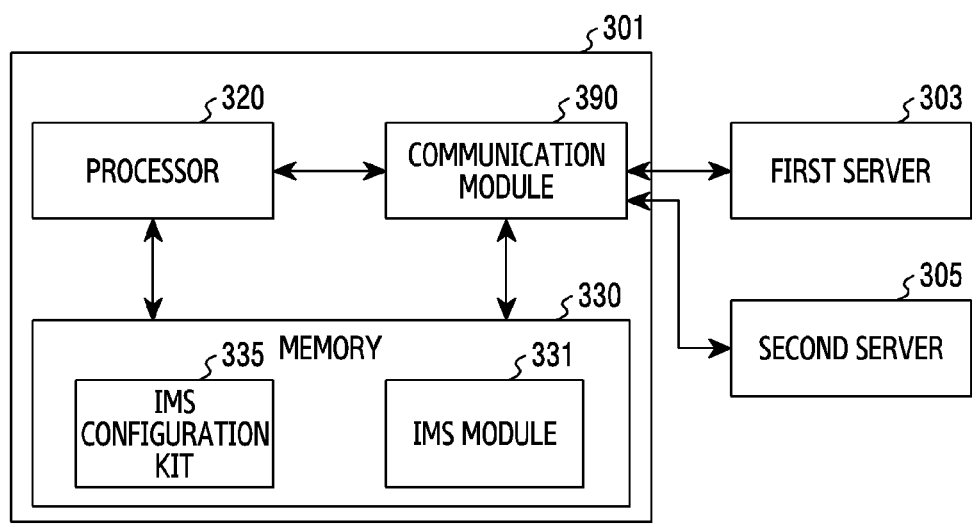
FIG. 3 illustrates a block diagram illustrating configurations related to an operation of updating IP multimedia subsystem (IMS) configuration information in an electronic device according to an embodiment.

FIG. 3 illustrates an example of a block diagram illustrating configurations related to an operation of updating IP multimedia subsystem (IMS) configuration information in an electronic device according to an embodiment. FIG. 3 may be described with reference to the configurations of FIGS. 1 and 2.

In an embodiment, an electronic device 301 may include a processor 320, a memory 330, a communication module 390, or a combination thereof. In an embodiment, the processor 320 may correspond to the processor 120 of FIG. 1. In an embodiment, the memory 330 may correspond to the memory 130 of FIG. 1. In an embodiment, the communication module 390 may correspond to the communication module 190 of FIG. 1.

In an embodiment, the processor 320 may determine the IMS configuration information using an IMS configuration kit 335 and an IMS module 331 stored in the memory 330 or a combination thereof. In an embodiment, the IMS configuration kit 335 or the IMS module 331 may correspond to the IMS configuration kit 283 or the IMS module 229 of FIG. 2. In an embodiment, the IMS configuration information may include mobile network operator (hereinafter, referred to as "MNO") information, global configuration information, and IMS profile information.

In an embodiment, the processor 320 may determine the MNO information using the IMS module 331. In an embodiment, the processor 320 may determine the MNO information corresponding to subscriber identification information obtained from a subscriber identity module (SIM) among a plurality of pieces of MNO information included in the MNO map. In an embodiment, the MNO map may be a database including MNO information for the plurality of pieces of MNO information. In an embodiment, the MNO information may be information of a structure having multiple fields. In an embodiment, each of the multiple fields of the MNO information may represent a mobile country code (MCC) of SIM (or universal SIM (USIM)), a mobile network code (MNC), a group identifier lever (GID), an MNO name, or a combination thereof used by the mobile network operator. In an embodiment, the SIM may correspond to the SIM 196 of FIG. 1. In an embodiment, the subscriber identification information obtained from the SIM may include MCC, MNC, GID, a service provider name, or a combination thereof.

In an embodiment, the processor 320 may determine the global configuration information in the global configuration database, based on the determined MNO information, using the IMS module 331. In an embodiment, the processor 320 may use the IMS module 331 to determine global configuration information corresponding to the determined MNO information among a plurality of pieces of global configuration information included in the global configuration database. In an embodiment, the global configuration database may be a database including a plurality of pieces of global configuration information. In an embodiment, the global configuration information may be information of a structure including a plurality of fields indicating a policy of a mobile network operator and necessary parameters. In an embodiment, each of the plurality of fields of the global configuration information may indicate information about the MNO name, the presence or absence of emergency assistance, and whether to display an icon related to a designated function (e.g., voice over wireless fidelity (VoWi-Fi), voice over LTE (VoLTE)), or a combination thereof.

In an embodiment, the processor 320 may determine the IMS profile information in the IMS profile database, based on the determined MNO information, using the IMS module 331. In an embodiment, the processor 320 may use the IMS module 331 to determine IMS profile information corresponding to the determined MNO information among a plurality of pieces of IMS profile information included in the IMS profile database. In an embodiment, the IMS profile database may be a database including a plurality of pieces of IMS profile information. In an embodiment, the IMS profile information may be information having a structure including a number of fields indicating IMS parameters for performing negotiation with an IMS server (e.g., a second server 305) operated by a mobile network operator. In an embodiment, each of the multiple fields of the IMS profile information may indicate information about a name, an MNO name, a public data network (PDN), a timer, a starting audio port, or a combination thereof.

In an embodiment, the processor 320 may determine the determined MNO information, the determined global configuration information, and the determined IMS profile information as IMS configuration information.

In an embodiment, the processor 320 may, through the communication module 390, perform IMS registration for the second server 305 of the mobile network operator based on the IMS configuration information. In an embodiment, in order to receive IMS service from the second server 305, the IMS registration may proceed through the operation of transmitting a packet, based on IMS configuration information, to the second server 305 by the electronic device 301, and receiving a response to the packet transmitted from the second server 305. In an embodiment, when the IMS registration for the second server 305 is completed, the electronic device 301 may receive IMS service including VoLTE from the second server 305.

In an embodiment, the processor 320 may update the IMS database using the IMS module 331. In an embodiment, the IMS database may include an MNO map, a global configuration database, an IMS profile database, or a combination thereof.

In an embodiment, the processor 320 may update the IMS database based on customer-specific customization (CSC)

data using the IMS module 331. In an embodiment, the CSC data may be data including USIM information and IMS configuration information.

In an embodiment, the processor 320 may identify renewal information for the IMS database in the CSC data using the IMS module 331. In an embodiment, the processor 320 may renew the IMS database based on the renewal information identified in the CSC data. In an embodiment, if update information is present in the CSC data, the processor 320 may renew the IMS database by renewing the entity of each of the plurality of fields of each of the plurality of pieces of configuration information included in the IMS database to refer to the update information.

In an embodiment, the processor 320 may renew the MNO map by renewing MNO information in which renewal information is present in CSC data, among a plurality of pieces of MNO information, using the IMS module 331. In an embodiment, the processor 320 may renew the global configuration database by renewing the global configuration information in which renewal information exists in the CSC data among a plurality of pieces of the global configuration information. In an embodiment, the processor 320 may renew the IMS profile database by renewing IMS profile information in which renewal information exists in the CSC data among a plurality of pieces of IMS profile information.

In an embodiment, the processor 320 may update the IMS database using the IMS module 331 and the IMS configuration kit 335. In an embodiment, the data for the IMS configuration kit 335 may include an MNO map, a global configuration database, and an IMS profile database.

In an embodiment, the processor 320 may obtain renewal information for the IMS database using the IMS module 331 and the IMS configuration kit 335. In an embodiment, the processor 320 may renew the IMS database based on the renewal information obtained using the IMS configuration kit 335. In an embodiment, the processor 320 may renew the IMS database by renewing the entity of each of a plurality of fields of each of a plurality of pieces of configuration information included in the IMS database, based on the renewal information obtained using the IMS configuration kit 335, to refer the obtained renewal information.

In an embodiment, the processor 320 may renew the MNO map by renewing MNO information corresponding to the obtained renewal information among a plurality of pieces of MNO information using the IMS module 331. In an embodiment, the processor 320 may renew the global configuration database by renewing global configuration information corresponding to the update information obtained from the plurality of pieces of global configuration information. In an embodiment, the processor 320 may renew the IMS profile database by renewing the IMS profile information corresponding to the renewal information obtained from the plurality of pieces of IMS profile information.

In an embodiment, when the IMS database is renewed, the processor 320 may redetermine the IMS configuration information using the IMS module 331. In an embodiment, when the IMS database is renewed, the processor 320 may redetermine the IMS configuration information, based on the renewal information referred to by an entity of a field of the renewed configuration information among a plurality of pieces of renewal information included in the renewed IMS database. In an embodiment, the IMS configuration information may include MNO information, global configuration information, and IMS profile information.

In an embodiment, the processor 320 may perform IMS re-registration for a second server 305 of a mobile network operator, based on the redetermined IMS configuration information. In an embodiment, the IMS re-registration may be performed through an operation of canceling the existing IMS registration, an operation of transmitting a packet, based on re-determined IMS configuration information, and an operation of receiving a response to a packet transmitted from the second server 305.

In an embodiment, the processor 320 may receive update data for the IMS configuration kit 335 from the first server 303. In an embodiment, the processor 320 may execute a store application provided by the first server 303 and identify whether an update to the IMS configuration kit 335 exists through the store application (e.g., Galaxy Store, Play Store, App Store) provided by the running first server 303. In an embodiment, if there is an update to the IMS configuration kit 335, the processor 320 may receive the update data for the IMS configuration kit 335 from the first server 303, based on the preset information (e.g., automatic update). In an embodiment, if there is an update to the IMS configuration kit 335, the processor 320 may notify the user of the presence of the update through an output device (e.g., the display device 160). In an embodiment, the processor 320 may receive update data for the IMS configuration kit 335 from the first server 303, based on user input requesting an update to the IMS configuration kit 335.

In an embodiment, the processor 320 may update the IMS configuration kit 335 when update data for the IMS configuration kit 335 is received from the first server 303.

In an embodiment, when the IMS configuration kit 335 is updated, the processor 320 may provide an update notification for the IMS configuration kit 335 to the IMS module 331 through the package manager 213.

In an embodiment, the processor 320 may obtain update information for the IMS database from the IMS configuration kit 335 using the IMS module 331. In an embodiment, when the IMS database is updated, the processor 320 may re-determine IMS configuration information using the IMS module 331.

Figure 4:
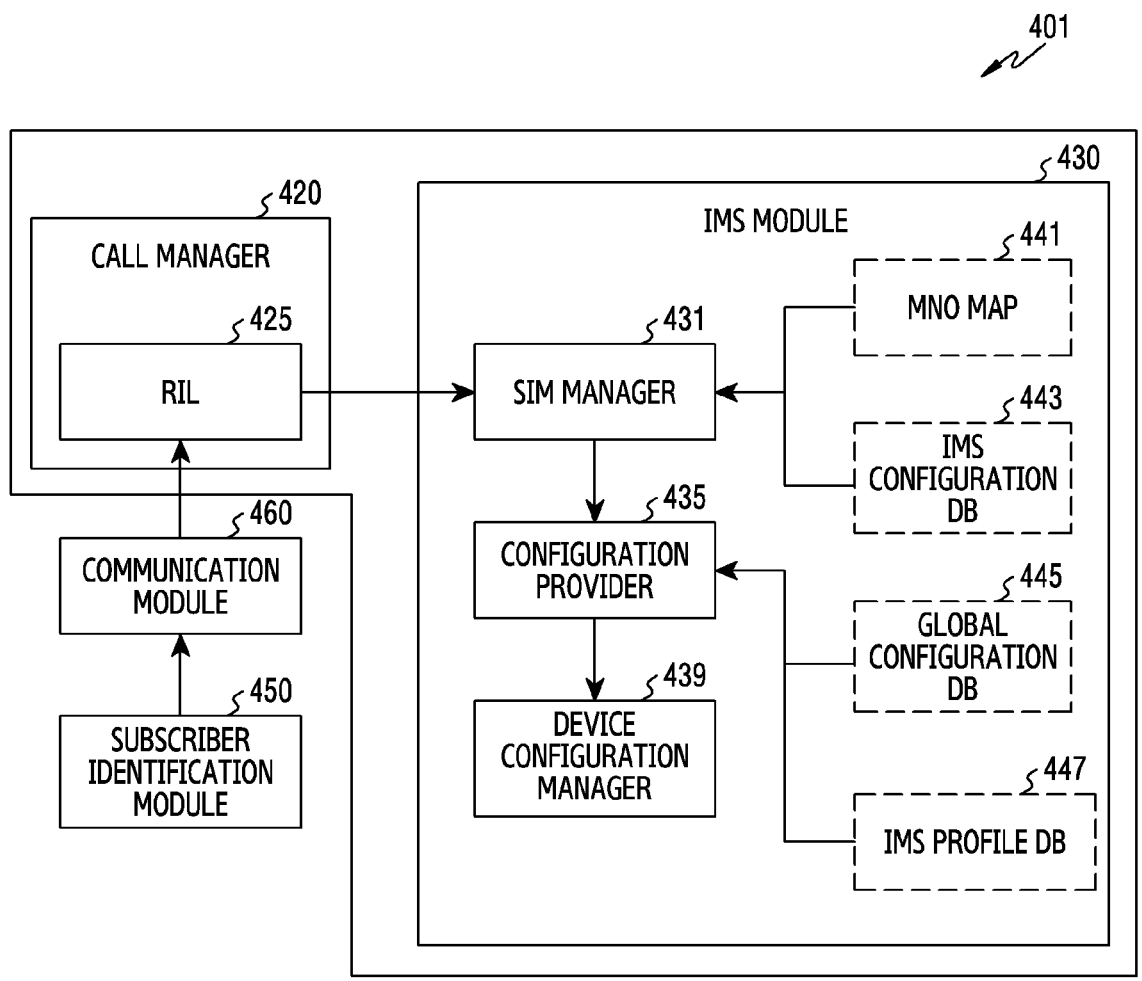
FIG. 4 illustrates a block diagram illustrating programs related to an operation of initially registering IMS configuration information in an electronic device according to an embodiment.

FIG. 4 illustrates an example of a block diagram illustrating programs related to an operation of initially registering IMS configuration information in an electronic device 401 according to an embodiment. FIG. 4 may be described with reference to the elements shown in FIGS. 1 to 3.

In an embodiment, the electronic device 401 may include a processor 410, a subscriber identification module 450, and a communication module 460. In an embodiment, the processor 410 may correspond to the processor 120 of FIG. 1 or the processor 320 of FIG. 3. In an embodiment, the subscriber identification module 450 may correspond to the SIM 196 of FIG. 1. In an embodiment, the communication module 460 may correspond to the communication module 190 of FIG. 1 or the communication module 390 of FIG. 3.

In an embodiment, the processor 410 may include a call manager 420 and an IMS module 430. In an embodiment, the call manager 420 may correspond to the call manager 225 of FIG. 2. In an embodiment, the IMS module 430 may correspond to the IMS module 229 of FIG. 2 or the IMS module 331 of FIG. 3.

In an embodiment, the call manager 420 may include a radio interface layer (RIL) 425. In an embodiment, the IMS module 430 may include a SIM manager 431, a configuration provider 435, a device configuration manager 439, or a combination thereof. In an embodiment, the IMS module 430 may include an MNO map 441, a CSC database 443, a global configuration database 445, an IMS profile database 447, or a combination thereof. In an embodiment, the MNO map 441, the global configuration database 445, or the IMS profile database 447 may be referred to as an IMS database.

In an embodiment, the processor 410 may obtain subscriber identification information stored in the subscriber identification module 450 through the communication module 390. In an embodiment, when the subscriber identification module 450 is inserted into the electronic device 401, the communication module 390 may obtain the subscriber identification information stored in the subscriber identification module 450, and may notify the processor 410 of an event including the acquired subscriber identification information. In an embodiment, the processor 410 may obtain subscriber identification information based on the event including the obtained subscriber identification information. In an embodiment, the subscriber identification information obtained in the subscriber identification module 450 may include an MCC, MNC, GID, service provider name, or combination thereof.

In an embodiment, the call manager 420 of the processor 410 may receive an event including the obtained subscriber identification information from the communication module 390 through an air interface layer 425. In an embodiment, the call manager 420 of the processor 410 may notify the IMS module 430 of an event including the obtained subscriber identification information through the air interface layer 425.

In an embodiment, the IMS module 430 of the processor 410 may receive an event including the obtained subscriber identification information from the call manager 420 through the SIM manager 431.

In an embodiment, the IMS module 430 of the processor 410 may determine MNO information matching the subscriber identification information through the SIM manager 431. In an embodiment, the IMS module 430 of the processor 410 may determine MNO information matching the subscriber identification information in the MNO map 441 through the SIM manager 431. In an embodiment, the MNO information may be configured as shown in Table 1 below.

TABLE 1

| MCCMNC | subset | GID1 | GID2 | spname | mnoname |
|---|---|---|---|---|---|
| 20404 | null | BAE0000 | null | null | VZW_US |

In an embodiment, referring to Table 1, the MNO information may include a MCCMNC field, a subset field, a GID1 field, a GID2 field, a service provider name (spname) field, an MNO name (mnoname) field, or a combination thereof.

In an embodiment, the entities of the MCCMNC field, subset field, GID fields, service provider name field, and MNO name field may be "20404", "null", "BAE0000", "null", "null", and "VZW_US", respectively.

In an embodiment, in the MNO map 441, when the MNO information matching the subscriber identification information refers to the update information of the CSC database 443, the IMS module 430 of the processor 410 may renew the MNO information matching the subscriber identification information, based on the update information of the CSC database 443 through the SIM manager 431. In an embodiment, an entity of some of the multiple fields included in the MNO information may refer to update information of the CSC database 443. For example, the entity of the MCCMNC field among a plurality of fields included in the MNO information may refer to the update information of the CSC database 443. For example, when the entity of the MCCMNC field refers to the update information of the CSC database 443, the IMS module 430 of the processor 410 may determine the value referred to by the entity of the MCCMNC field, based on the update information of the CSC database 443, through the SIM manager 431.

In an embodiment, the IMS module 430 of the processor 410 may provide the determined MNO information to the configuration provider 435 of the IMS module 430 through the SIM manager 431. In an embodiment, the IMS module 430 of the processor 410 may provide updated MNO information to the configuration provider 435 of the IMS module 430 through the SIM manager 431.

In an embodiment, the IMS module 430 of the processor 410 may determine IMS configuration information through the configuration provider 435.

In an embodiment, the IMS module 430 of the processor 410 may determine global configuration information corresponding to MNO information in the global configuration database 445 through the configuration provider 435. In an embodiment, the global configuration information may be configured as shown in Table 2 below.

TABLE 2

| name | mnoname | pdn | timer | audio_port_start | evs_bandwidth_send |
|---|---|---|---|---|---|
| VZW_VoLTE | VZW_US | ims | 1:3000 | 49158 | swb |

In an embodiment, referring to Table 2, the global configuration information may include a name field, an MNO name field, a public data network (PDN) field, a timer field, an audio port start (audio_port_start) field, an enhanced voice services (EVS) bandwidth transmission (evs_bandwidth_send) field, or a combination thereof. In an embodiment, the timer field may indicate the expiration time of the IMS packet. In an embodiment, the entities of the name field, MNO name field, PDN field, timer field, audio port start field, and EVS bandwidth transmission field may be "VZW_VoLTE", "VZW_US", "ims", "1:3000", "49158", and "swb", respectively.

In an embodiment, in the global configuration database 445, when the global configuration information matching the MNO information refers to the update information of the CSC database 443, the IMS module 430 of the processor 410 may renew the global configuration information matching the MNO information, based on the renewal information of the CSC database 443, through the configuration provider 435. In an embodiment, entities of some of the multiple fields included in the global configuration information may refer to the renewal information of the CSC database 443. For example, the entity of the PDN field among a plurality of fields included in the global configuration information may refer to update information of the CSC database 443. For example, if the entity of the PDN field refers to the renewal information of the CSC database 443, the IMS module 430 of the processor 410 may determine the value referred to by the entity of the PDN field, based on the update information of the CSC database 443, through the configuration provider 435.

In an embodiment, the IMS module 430 of the processor 410 may determine the IMS profile information corresponding to the MNO information in the IMS profile database 447 through the configuration provider 435. In an embodiment, the IMS profile information may be configured as shown in Table 3 below.

TABLE 3

| mnoname | no_sim_emergency_doman_setting | show_vowifi_regi_icon | show_volte_regi_icon |
|---|---|---|---|
| VZW_US | PS | false | false |

In an embodiment, referring to FIG. 3, the IMS profile information may include a MNO name (mnoname) field, a no SIM emergency domain configuration (no_sim_emergency_doman_setting) field, a voice over Wi-Fi (VoWiFi) registration icon display (show_vowifi_regi_icon) field, a voice over LTE (VoLTE) registration icon display (show_volte_regi_icon) field, or a combination thereof. In an embodiment, the timer field may indicate the expiration time of the IMS packet. In an embodiment, the entities of the MNO name field, the no SIM emergency domain configuration field, the VoWiFi registration icon display field, and the VoLTE registration icon display field may be "VZW_US", "PS", "false", and "false", respectively.

In an embodiment, in the IMS profile database 447, if the IMS profile information matching the MNO information refers to the update information of the CSC database 443, the IMS module 430 of the processor 410 may renew the IMS profile information matching the MNO information, based on the update information of the CSC database 443, through the configuration provider 435. In an embodiment, entities of some of the multiple fields included in the IMS profile information may refer to renewal information of the CSC database 443. For example, the entity of the no SIM emergency domain configuration field among a plurality of fields included in the IMS profile information may refer to the update information of the CSC database 443. For example, if the entity of the no SIM emergency domain configuration field refers to the update information of the CSC database 443, the IMS module 430 of the processor 410 may determine a value referred to by the entity of the core emergency domain configuration field, based on the update information of the CSC database 443, through the configuration provider 435.

In an embodiment, the IMS module 430 of the processor 410 may determine MNO information, global configuration information corresponding to MNO information, and IMS profile information corresponding to MNO information as IMS configuration information through the configuration provider 435.

In an embodiment, the IMS module 430 of the processor 410 may provide IMS configuration information to the device configuration manager 439 through the configuration provider 435. In an embodiment, the IMS module 430 of the processor 410 may provide updated IMS configuration information to the device configuration manager 439 through the configuration provider 435.

In an embodiment, the IMS module 430 of the processor 410 may perform IMS registration with the second server 305 through the device configuration manager 439, based on the IMS configuration information. In an embodiment, the IMS module 430 of the processor 410 may perform IMS registration for a server of a mobile network operator (e.g., the second server 305), based on MNO information, global configuration information, and IMS profile information through a communication module (e.g., the communication module 390). In an embodiment, in order to receive IMS service from the second server 305, for IMS registration, the electronic device 301 may transmit a packet, based on MNO information, global configuration information, and IMS profile information to the second server 305 and receive a response to the transmitted packet from the second server 305. In an embodiment, when the IMS registration for the second server 305 is completed, the electronic device 401 may receive an IMS service including VoLTE from the second server 305.

Figure 5:
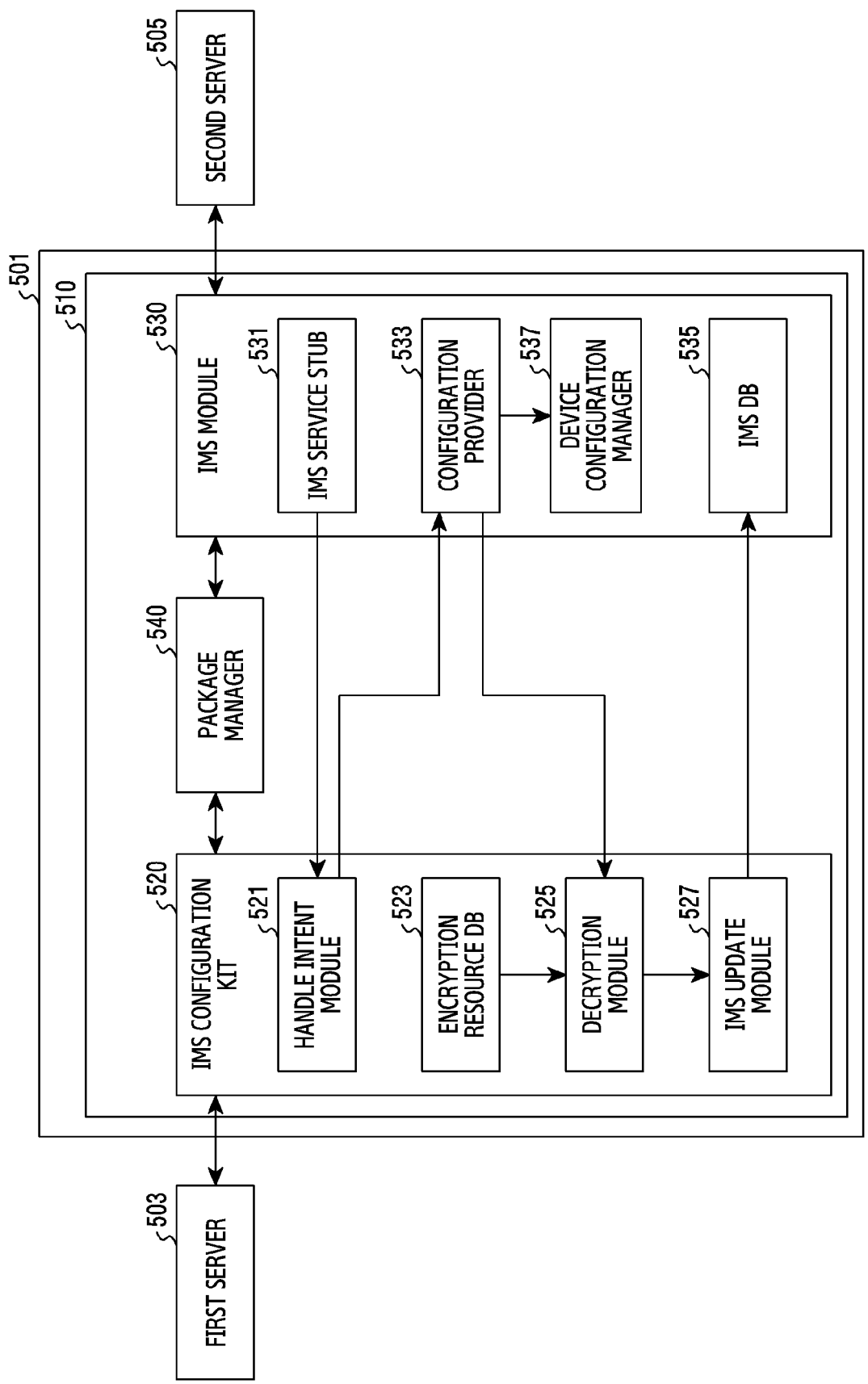
FIG. 5 illustrates a block diagram illustrating programs related to an operation of updating IMS configuration information in an electronic device according to an embodiment.

FIG. 5 illustrates an example of a block diagram illustrating configurations related to an operation of updating an IMS database 535 in the electronic device 501 according to an embodiment. FIG. 5 may be described with reference to the configurations of FIGS. 1 to 3.

In an embodiment, the electronic device 501 may include a processor 510. In an embodiment, the processor 510 may correspond to the processor 120 of FIG. 1 or the processor 320 of FIG. 3.

In an embodiment, the processor 510 may include an IMS configuration kit 520, an IMS module 530, and a package manager 520. In an embodiment, the IMS configuration kit 520 may include a handle intent module 521, an encryption resource database 523, a decryption module 525, an IMS update module 527, or a combination thereof. In an embodiment, the IMS module 530 may include an IMS service stub 531, a configuration provider 533, an IMS database 535, a device configuration manager 537, or a combination thereof. In an embodiment, the IMS configuration kit 520 may correspond to the IMS configuration kit 283 of FIG. 2 or the IMS configuration kit 335 of FIG. 3. In an embodiment, the IMS module 530 may correspond to the IMS module 229 of FIG. 2 or the IMS module 331 of FIG. 3. In an embodiment, the configuration provider 533 may correspond to the configuration provider 435 of FIG. 4. In an embodiment, the IMS database 535 may correspond to the MNO map 441, the global configuration database 445, and the IMS profile database 447 of FIG. 4. In an embodiment, the device configuration manager 537 may correspond to the device configuration manager 439 of FIG. 4. In an embodiment, the package manager 540 may correspond to a package manager 213 of FIG. 2.

In an embodiment, the processor 510 may execute the IMS configuration kit 520, the IMS module 530, and the package manager 520. In an embodiment, execution data for the IMS configuration kit 520, the IMS module 530, and the package manager 520 may be stored in memory (e.g., the memory 130 of FIG. 1 or the memory 330 of FIG. 3).

In an embodiment, the processor 510 may receive update data for the IMS configuration kit 520 from the first server 503. In an embodiment, the processor 510 may receive update data for the IMS configuration kit 520 from the first server 503 through an application store (e.g., Galaxy Store, Play Store, App Store) provided by the operator of the first server 503. In an embodiment, the update data may be data generated by the creator of the IMS configuration kit 520, based on information provided by a mobile network operator (MNO) managing the second server 505. In an embodiment, the update data may be data uploaded by the author of the IMS configuration kit 520 to the first server 503. In an embodiment, the update data may include information changed according to the mobile network operation policy of the mobile network operator (MNO) in the IMS configuration information.

In an embodiment, the processor 510 may update the IMS configuration kit 520 based on the received update data.

In an embodiment, when the update to the IMS configuration kit 520 is performed, the processor 510 may provide an update notification for the IMS configuration kit 520 to the IMS module 530 through the package manager 540.

In an embodiment, the processor 510 may identify an update notification for the IMS configuration kit 520 using the IMS service stub 531. In an embodiment, when an update notification for the IMS configuration kit 520 is identified, the processor 510 may request the IMS configuration kit 520 to execute the device configuration service using the IMS service stub 531. In an embodiment, when the update notification for the IMS configuration kit 520 is identified, the processor 510 may execute the IMS configuration kit 520 and request the running IMS configuration kit 520 to execute the device configuration service.

In an embodiment, the processor 510 may query the IMS module 530 for a key with which to decrypt the encryption resource database 523 of the IMS configuration kit 520 in response to the execution request of the device configuration service, using the handle intent module 521 of the IMS configuration kit 520.

In an embodiment, the processor 510 may provide a key for decoding the resource data included in the encryption resource database 523 to the IMS configuration kit 520 in response to the request for the key for decryption using the configuration provider 533 of the IMS module 530. In an embodiment, the key for decryption may be a key based on a predefined algorithm (e.g., a secure hash algorithm 256 (SHA 256)).

In an embodiment, the processor 510 may decrypt the resource data included in the encryption resource database 523, based on the key for decryption. In an embodiment, the processor 510 may decrypt the resource data included in the encryption resource database 523 using the decryption module 525 of the IMS configuration kit 520.

In an embodiment, when the resource data included in the encryption resource database 523 is decrypted, the processor 510 may provide the decrypted resource data to the IMS module 530 using the IMS configuration kit 520. In an embodiment, when the resource data included in the encryption resource database 523 is decrypted, the processor 510 may provide the decrypted resource data to the IMS module 530 using the IMS update module 527 of the IMS configuration kit 520. In an embodiment, the processor 510 may notify the user of information indicating that the update of IMS configuration is possible, through an output device (e.g., the display device 160). In an embodiment, when information indicating that the update of the IMS configuration is possible is provided, when input for requesting update of the IMS configuration is received from the user through an input device (e.g., the input device 150), the processor 510 may provide the decrypted resource data to the IMS module 530 using the IMS configuration kit 520.

In an embodiment, the processor 510 may renew the IMS database 535 of the IMS module 530, based on the decrypted resource data. In an embodiment, the processor 510 may renew the IMS database 535 using the IMS module 530 so that the IMS database 535 refers to the decrypted resource data. In an embodiment, the processor 510 may store the decrypted resource data in a memory area allocated to the IMS module 530 and renew the IMS database 535 so that the IMS database 535 refers to the decoded resource data.

In an embodiment, when the IMS database 535 of the IMS module 530 is renewed, the processor 510 may renew the IMS configuration information, based on the updated IMS database 535. In an embodiment, when the IMS database 535 of the electronic device 501 is renewed, the processor 510 may renew the IMS configuration information using the IMS module 530.

In an embodiment, when the IMS database 535 of the IMS module 530 is renewed, the processor 510 may identify whether information corresponding to IMS configuration information registered for the second server 305 in the IMS database 535 has been renewed. In an embodiment, when the information corresponding to the IMS configuration information registered for the second server 305 in the IMS database 535 is renewed, the processor 510 may renew the IMS configuration information using the IMS module 530.

In an embodiment, the processor 510 may identify whether data related to a mobile network operator providing IMS service to the electronic device 501 in the IMS database 535 has been renewed. In an embodiment, when data related to a mobile network operator providing IMS service to the electronic device 501 in the IMS database 535 is renewed, the processor 510 may renew IMS configuration information using the IMS module 530. In an embodiment, when data related to a mobile network operator providing IMS service to the electronic device 501 in the IMS database 535 is not renewed, the processor 510 might not renew the IMS configuration information using the IMS module 530.

In an embodiment, the processor 510 may identify whether data related to model information of the electronic device 501 has been renewed in the IMS database 535. In an embodiment, when data related to model information of the electronic device 501 has been renewed in the IMS database 535, the processor 510 may renew the IMS configuration information using the IMS module 530. In an embodiment, when data related to model information of the electronic device 501 has not been renewed in the IMS database 535, the processor 510 might not renew the IMS configuration information using the IMS module 530.

In an embodiment, when the IMS configuration information is renewed, the processor 510 may again perform IMS registration for the second server 305 of the mobile network operator, based on the IMS configuration information. In an embodiment, when the IMS configuration information is updated, the processor 510 may again perform IMS registration for the second server 305 of the mobile network operator using the IMS configuration information.

In the description related to FIG. 5, the electronic device 501 is illustrated as updating the IMS database 535 and the IMS configuration information when the IMS configuration kit 520 is updated, but this is only an example. In an embodiment, the electronic device 501 may also renew the IMS database 535 and the IMS configuration information when the IMS configuration kit 520 is initialized or when the IMS configuration kit 520 is deleted.

In an embodiment, the processor 510 may identify a request for deletion (or initialization) of the IMS configuration kit 520. In an embodiment, the processor 510 may identify user input for deletion (or initialization) of the IMS configuration kit 520 and identify requests for deletion (or initialization) of the IMS configuration kit 520, based on the identified user input.

In an embodiment, the processor 510 may delete (or initialize) the IMS configuration kit 520, based on the identified deletion request (or initialization request). In an embodiment, when the deletion request is identified, the processor 510 may process the deletion request for the IMS configuration kit 520 by changing the version of the IMS configuration kit 520 to an initial version.

In an embodiment, when deletion (or initialization) of the IMS configuration kit 520 is performed, the processor 510 may provide a deletion notification (or initialization notification) for the IMS configuration kit 520 to the IMS module 530 through the package manager 540.

In an embodiment, the processor 510 may identify a deletion notification (or initialization notification) for the IMS configuration kit 520 using the IMS service stub 531.

In an embodiment, when the deletion notification (or initialization notification) for the IMS configuration kit 520 is identified, the processor 510 may initialize the IMS database 535 using the configuration provider 533. In an embodiment, the processor 510 may initialize the IMS database 535 such that the IMS database 535 does not refer to the decrypted resource data from the IMS configuration kit 520. In an embodiment, when the deletion notification (or initialization notification) for the IMS configuration kit 520 is identified, the processor 510 may delete the decrypted resource data stored in the memory area allocated to the IMS module 530.

In an embodiment, when the IMS database 535 of the IMS module 530 is initialized, the processor 510 may update IMS configuration information, based on the initialized IMS database 535. In an embodiment, when the IMS database 535 of the IMS module 530 is initialized, the processor 510 may renew IMS configuration information using the IMS module 530.

In an embodiment, when the IMS configuration information is renewed, the processor 510 may again perform IMS registration for the second server 505 of the mobile network operator, based on the updated IMS configuration information. In an embodiment, when the IMS configuration information is renewed, the processor 510 may re-register the IMS with the second server 505 of the mobile network operator using the IMS configuration information.

Figure 6:
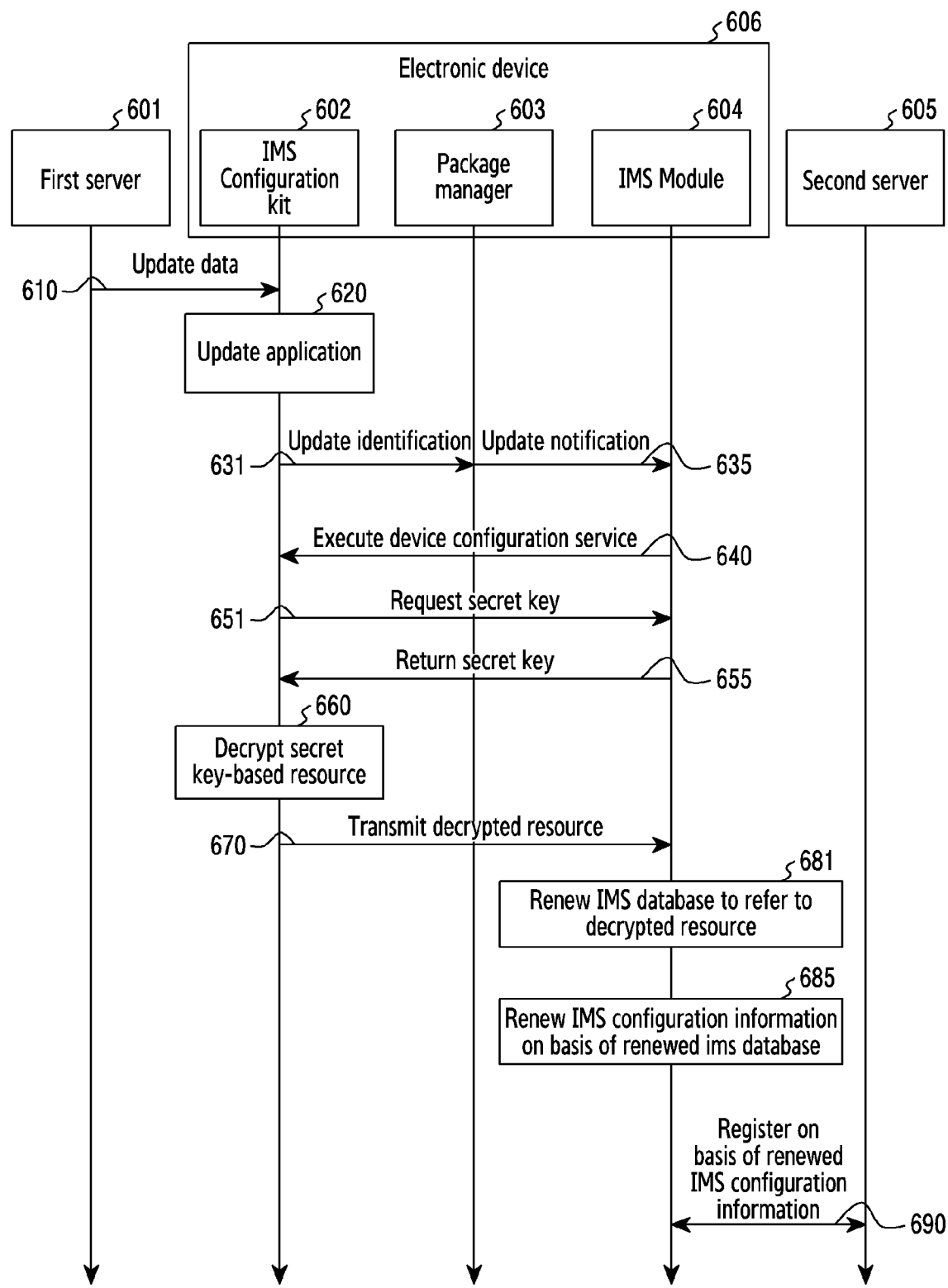
FIG. 6 illustrates a flowchart illustrating an operation of updating IMS configuration information in an electronic device according to an embodiment.

FIG. 6 illustrates an example of a flowchart illustrating an operation of updating IMS configuration information in an electronic device 606 according to an embodiment. FIG. 6 is described with reference to the configurations of FIGS. 1 to 3 and 5.

Referring to FIG. 6, in operation 610, the electronic device 606 may receive update data from a first server 601. In an embodiment, the electronic device 606 may receive update data from the first server 601 through a store application (e.g., Galaxy Store, Play Store, App Store). In an embodiment, the first server 601 may be a server managed by an operator who provides a store application.

In operation 620, the electronic device 606 may update the IMS configuration kit 602. In an embodiment, the electronic device 606 may update an IMS configuration kit 602, based on the update data.

In operation 631, the electronic device 606 may identify the update of the IMS configuration kit 602 through the package manager 603.

In operation 635, the electronic device 606 may notify the IMS module 604 of the update of the IMS configuration kit 602 through the package manager 603. In an embodiment, the IMS module 604 may identify update notifications for the IMS configuration kit 602 using an IMS service stub (e.g., the IMS service stub 531).

In operation 640, the electronic device 606 may request the IMS configuration kit 602 to execute the device configuration service through the IMS module 604. In an embodiment, when an update notification for the IMS configuration kit 602 is identified, the IMS module 604 may request the IMS configuration kit 602 to execute the device configuration service using the IMS service stub (e.g., the IMS service stub 531).

In operation 651, the electronic device 606 may request the secret key from the IMS module 604 using the IMS configuration kit 602. In an embodiment, the IMS configuration kit 602 may request the IMS module 604 for a secret key for decryption of the cryptographic resource database (e.g., the cryptographic resource database 523) of the IMS configuration kit 602 using the handle intent module of the IMS configuration kit 602 (e.g., the handle intent module 521) in response to the request to execute the device configuration service.

In operation 655, the electronic device 606 may use the IMS module 604 to return the secret key to the IMS configuration kit 602. In an embodiment, the IMS module 604 may provide the secret key for decryption of the resource included in the cryptographic resource database (e.g., the cryptographic resource database 523) using the configuration provider of the IMS module 602 (e.g., configuration provider 533). In an embodiment, the secret key for decryption may be a key based on a predefined algorithm (e.g., SHA 256).

In operation 660, the electronic device 606 may decrypt the resource included in the encryption resource database, based on the secret key using the IMS configuration kit 602. In an embodiment, the IMS configuration kit 602 may decrypt the resources included in the encryption resource database using the decryption module (e.g., the decryption module 525) of the IMS configuration kit 602.

In operation 670, the electronic device 606 may transmit the decoded resource to the IMS module 604 using the IMS configuration kit 602.

In operation 681, the electronic device 606 may renew the IMS database (e.g., the IMS database 535) using the IMS module 604 so that the IMS database (e.g., the IMS database 535) of the IMS module 604 refers to the decrypted resource.

In operation 685, the electronic device 606 may renew the IMS configuration information, based on the renewed IMS database (e.g., the IMS database (535)) using the IMS module 604.

In an embodiment, the IMS module 604 may identify whether information corresponding to IMS configuration information registered for the second server 605 in the IMS database (e.g., the IMS database 535) has been renewed. In an embodiment, when information corresponding to the registered IMS configuration information for the second server 605 in the IMS database (e.g., the IMS database 535) has been renewed, the IMS module 604 may renew the IMS configuration information.

In an embodiment, the IMS module 604 may identify whether data related to a mobile network operator providing an IMS service to the electronic device 605 in an IMS database (e.g., the IMS database 535) has been renewed. In an embodiment, when data related to a mobile network operator providing IMS service to an electronic device 605 in an IMS database (e.g., the IMS database 535) has been renewed, the IMS module 604 may renew the IMS configuration information.

In an embodiment, the IMS module 604 may identify whether data related to model information of the electronic device 501 has been renewed in an IMS database (e.g., the IMS database 535). In an embodiment, when data related to model information of the electronic device 501 has been renewed in an IMS database (e.g., the IMS database 535), the IMS module 604 may renew the IMS configuration information.

In operation 690, the electronic device 606 may register the renewed IMS configuration information with the second server 605 using the IMS module 604. In an embodiment, the electronic device 606 may transmit a packet including IMS configuration information to the second server 605 using the IMS module 604, and may receive a response for the packet transmitted from the second server 605 to thereby register IMS configuration information.

Figure 7:
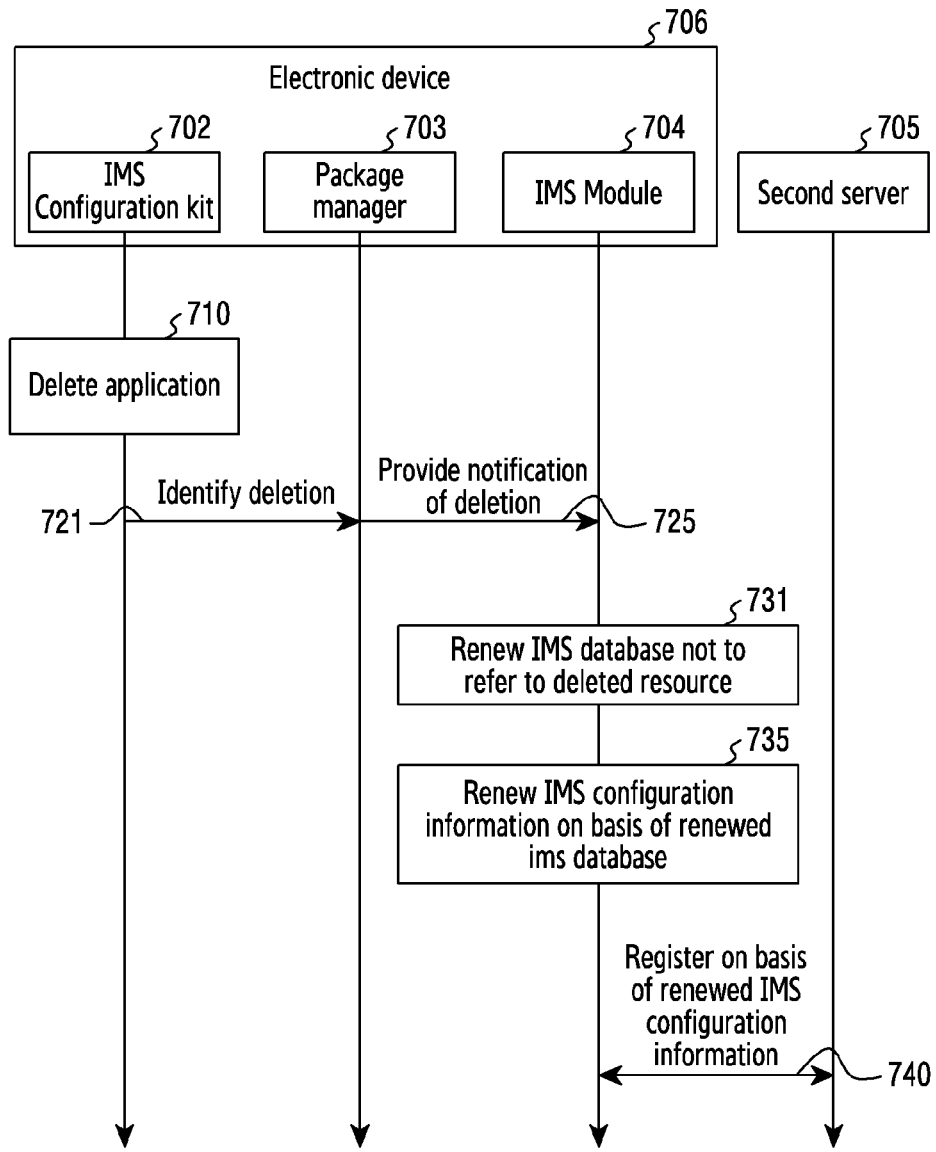
FIG. 7 illustrates a flowchart illustrating an operation of updating IMS configuration information in an electronic device according to an embodiment.

FIG. 7 illustrates an example of a flowchart illustrating an operation of updating IMS configuration information in an electronic device 706 according to an embodiment.

Referring to FIG. 7, in operation 710, the electronic device 706 may delete the IMS configuration kit 702. In an embodiment, the electronic device 706 may identify user input for deletion of the IMS configuration kit 702 and delete the IMS configuration kit 702, based on the identified user input.

In operation 721, the electronic device 706 may identify deletion of the IMS configuration kit 702 through the package manager 703.

In operation 725, the electronic device 706 may notify the IMS module 704 of the deletion of the IMS configuration kit 702 through the package manager 703. In an embodiment, the IMS module 704 may identify a deletion notification for the IMS configuration kit 702 using the IMS service stub (e.g., the IMS service stub 531).

In operation 731, the electronic device 706 may renew the IMS database (e.g., the IMS database 535) using the IMS module 704 such that the IMS database (e.g., the IMS database 535) of the IMS module 704 does not refer to the deleted resource. In an embodiment, the IMS module 704 may identify the deleted resource, based on the deletion notification for the IMS configuration kit 702. In an embodiment, the IMS module 704 may update the IMS database (e.g., the IMS database 535) so that the IMS database (e.g., the IMS database 535) has the value before the deleted resource was added.

In operation 735, the electronic device 706 may update the IMS configuration information based on the updated IMS database (e.g., the IMS database 535) using the IMS module 704.

In operation 740, the electronic device 706 may register the updated IMS configuration information in the second server 705 using the IMS module 704. In an embodiment, the electronic device 706 may register the IMS configuration information by transmitting a packet including IMS configuration information to the second server 705 using the IMS module 704 and receiving a response for the packet transmitted from the second server 705.

The electronic device 101 and an operation method thereof according to an embodiment can renew IMS configuration information by receiving update data of an IMS configuration kit (e.g., a SIM mobility kit (SMK) application) through a store application, updating the IMS configuration kit, based on the received update data, and updating the IMS configuration information, based on the resources included in the updated IMS configuration kit.

As described above, an electronic device 101 according to an embodiment may include a communication circuit, a processor operatively connected to the communication circuit, and a memory operatively connected to the processor, wherein, when executed, the memory may store instructions to cause the processor to: update an application including IP multimedia subsystem (IMS)-related data, based on update data received from a first server through the communication circuit; obtain updated IMS-related data through the application when the application is updated; and renew IMS configuration information, based on the obtained IMS-related data.

In an embodiment, when executed, the instructions may cause the processor to request a second server to configure an IMS service through the communication circuit, based on the renewed IMS configuration information.

In an embodiment, when executed, the instructions may cause the processor to: determine whether there is an update of first data related to a mobile network operator providing an IMS service to the electronic device based on the obtained IMS-related data; and renew the IMS configuration information if there is an update of the first data.

In an embodiment, when executed, the instructions may cause the processor to: determine whether there is an update of second data related to model information of the electronic device based on the obtained IMS-related data; and renew the IMS configuration information if there is an update of the second data.

In an embodiment, when executed, the instructions may cause the processor to: execute the application when the application is updated; and obtain the updated IMS-related data through the executed application.

In an embodiment, when executed, the instructions may cause the processor to: identify a key request from the executed application; provide a key corresponding to the identified key request to the executed application; and obtain a decrypted data as the updated IMS-related data from the executed application, based on the key.

In an embodiment, when executed, the instructions cause the processor to: identify a deletion request for the application; delete the application when the deletion request is identified; and initialize the IMS configuration information when the application is deleted.

In an embodiment, when executed, the instructions may cause the processor to request a second server to configure an IMS service through the communication circuit, based on a configured value related to the initialized IMS configuration information.

In an embodiment, the IMS-related data may include mobile network operator (MNO) information, global configuration information, IMS profile information, or a combination thereof.

In an embodiment, when executed, the instructions may cause the processor to receive update data for the application including the IMS-related data through the communication circuit using an application provided by an operator of the first server.

A method of operating an electronic device 101 according to an embodiment may include: updating an application including IP multimedia subsystem (IMS)-related data, based on update data received from a first server through a communication circuit of the electronic device; obtaining updated IMS-related data through the application when the application is updated; and renewing IMS configuration information, based on the obtained IMS-related data.

An embodiment may further include requesting a second server to configure an IMS service through the communication circuit, based on the renewed IMS configuration information.

In an embodiment, the renewing the IMS configuration information may further include: determining whether there is an update of first data related to a mobile network operator providing an IMS service to the electronic device based on the obtained IMS-related data; and renewing the IMS configuration information if there is an update of the first data.

In an embodiment, the renewing the IMS configuration information may further include: determining whether there is an update of second data related to model information of the electronic device based on the obtained IMS-related data; and renewing the IMS configuration information if there is an update of the second data.

In an embodiment, the obtaining the updated IMS-related data may further include: executing the application when the application is updated; and obtaining the updated IMS-related data through the executed application.

In an embodiment, the obtaining the updated IMS-related data may further include: identifying a key request from the executed application; providing a key corresponding to the identified key request to the executed application; and obtaining a decrypted data as the updated IMS-related data from the executed application based on the key.

An embodiment may further include: identifying a deletion request for the application; deleting the application, when the deletion request is identified; and initializing the IMS configuration information when the application is deleted.

An embodiment may further include requesting a second server to to configure an IMS service through the communication circuit, based on a configured value related to the initialized IMS configuration information.

In an embodiment, the IMS-related data may include mobile network operator (MNO) information, global configuration information, IMS profile information, or a combination thereof.

An embodiment may further include receiving update data for the application including the IMS-related data through the communication circuit using an application provided by an operator of the first server.

As described above, an IMS configuration kit (e.g., SIM mobility kit (SMK)) according to an embodiment may include an encryption resource database 523 in which IMS configuration information is updated based on update data from a server, a handle intent module 521 to query the key for decryption of the IMS configuration information of the encryption resource database 523 to the IMS module 530 in response to an execution request of the device configuration service, a decryption module 525 for decrypting the IMS configuration information of the encryption resource database 523 using a key for decryption from the IMS module 530, and an IMS update module 527 for providing the decrypted IMS configuration information to the IMS module 530 when the IMS configuration information of the resource database 523 has been decrypted.

In an embodiment, the IMS update module 527 may notify the user through the output device (e.g., the display device 160) of information indicating that update of the IMS configuration is possible.

In an embodiment, when input for requesting update of the IMS configuration is received from the user through the input device (e.g., the input device 150) after the information indicating that the update of the IMS configuration is possible is provided, the IMS update module 527 may provide the decoded IMS configuration information to the IMS module 530.

In an embodiment, the key for decryption may be a key based on a predetermined algorithm (e.g., a Secure Hash Algorithm 256 (SHA 256)).

Methods based on the embodiments disclosed in the claims and/or specification of the present disclosure can be implemented in hardware, software, or any combination thereof.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (e.g., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

While the present disclosure has been illustrated and described with reference to various example embodiments thereof, it will be understood by those skilled in the art that various changes in form and details may be made therein without departing from the spirit and scope of the present disclosure as defined by the appended claims. Therefore, the scope of the present disclosure is not limited by the detailed description thereof but is defined by the appended claims, and all differences within equivalents of the scope will be understood as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a communication circuit;
a processor operatively connected to the communication circuit; and
a memory operatively connected to the processor, wherein the processor is configured to:
 execute a first application provided by a first server,
 identify whether an update to an IP multimedia subsystem (IMS) configuration information exists through the first application,
 if the update to the IMS configuration information exists, receive update data from the first server through the communication circuit,
 update a second application including IMS-related data, based on the update data,
 based on updating the second application, obtain updated IMS-related data through the second application,
 renew the IMS configuration information, based on the obtained IMS-related data, and
 transmit the renewed IMS configuration information to a second server through the communication circuit, wherein the second server configures an IMS service based on the renewed IMS configuration information transmitted from the electronic device.

2. The electronic device of claim 1, wherein the processor is further configured to:
 determine whether there is an update of first data related to a mobile network operator providing the IMS service to the electronic device based on the obtained IMS-related data; and
 based on the update of the first data, renew the IMS configuration information.

3. The electronic device of claim 1, wherein the processor is further configured to:
 determine whether there is an update of second data related to model information of the electronic device based on the obtained IMS-related data; and
 based on the update of the second data, renew the IMS configuration information.

4. The electronic device of claim 1, wherein the processor is further configured to:
 based on updating the second application, execute the second application; and
 obtain the updated IMS-related data through the executed second application.

5. The electronic device of claim 4, wherein the processor is further configured to:
 identify a key request from the executed second application;
 provide a key corresponding to the identified key request to the executed second application; and
 obtain decrypted data as the updated IMS-related data from the executed second application, based on the key.

6. The electronic device of claim 1, wherein the processor is further configured to:
 identify a request to delete the second application;
 based on the deletion request, delete the second application; and
 based on the deletion of the second application, initialize the IMS configuration information.

7. The electronic device of claim 6, wherein the processor is further configured to request the second server to configure the IMS service through the communication circuit, based on a configured value related to the initialized IMS configuration information.

8. The electronic device of claim 1, wherein the IMS-related data comprises at least one of mobile network operator (MNO) information, global configuration information, IMS profile information.

9. A method of operating an electronic device, the method comprising:
 executing a first application provided by a first server;
 identifying whether an update to an IP multimedia subsystem (IMS) configuration information exists through the first application;
 if the update to the IMS configuration information exists, receiving update data from the first server through a communication circuit;
 updating a second application including IMS-related data, based on the update data;
 based on updating the second application, obtaining updated IMS-related data through the second application;
 renewing the IMS configuration information, based on the obtained IMS-related data; and
 transmitting the renewed IMS configuration information to a second server through the communication circuit, wherein the second server configures an IMS service based on the renewed IMS configuration information transmitted from the electronic device.

10. The method of claim 9, wherein the renewing the IMS configuration information further comprises:
 determining whether there is an update of a first data related to a mobile network operator providing the IMS service to the electronic device based on the obtained IMS-related data; and
 based on the update of the first data, renewing the IMS configuration information.

11. The method of claim 9, wherein the renewing the IMS configuration information further comprises:
 determining whether there is an update of second data related to model information of the electronic device based on the obtained IMS-related data; and
 based on the update of the second data, renewing the IMS configuration information.

12. The method of claim 9, wherein the obtaining the updated IMS-related data further comprises:
 based on updating the second application, executing the second application; and
 obtaining the updated IMS-related data through the executed second application.

13. The method of claim 12, wherein the obtaining the updated IMS-related data further comprises:
 identifying a key request from the executed second application;
 providing a key corresponding to the identified key request to the executed second application; and
 obtaining a decrypted data as the updated IMS-related data from the executed second application, based on the key.

14. The method of claim 9, further comprising:
 identifying a deletion request for the second application;
 based on the deletion request, deleting the second application; and
 based on deleting the second application, initializing the IMS configuration information.

15. The method of claim 14, further comprising requesting the second server to configure the IMS service through the communication circuit, based on a configured value related to the initialized IMS configuration information.

16. The method of claim 9, wherein the IMS-related data comprises at least one of mobile network operator (MNO) information, global configuration information, IMS profile information.

* * * * *